United States Patent
Tsai et al.

(10) Patent No.: US 12,254,681 B2
(45) Date of Patent: Mar. 18, 2025

(54) MULTI-MODAL TEST-TIME ADAPTATION

(71) Applicant: NEC Laboratories America, Inc., Princeton, NJ (US)

(72) Inventors: Yi-Hsuan Tsai, Santa Clara, CA (US); Bingbing Zhuang, San Jose, CA (US); Samuel Schulter, New York, NY (US); Buyu Liu, Cupertino, CA (US); Sparsh Garg, San Jose, CA (US); Ramin Moslemi, Pleasanton, CA (US); Inkyu Shin, Daejeon (KR)

(73) Assignee: NEC Corporation, Tokyo (JP)

( * ) Notice: Subject to any disclaimer, the term of this patent is extended or adjusted under 35 U.S.C. 154(b) by 366 days.

(21) Appl. No.: 17/903,393

(22) Filed: Sep. 6, 2022

(65) Prior Publication Data
US 2023/0081913 A1    Mar. 16, 2023

Related U.S. Application Data

(60) Provisional application No. 63/279,715, filed on Nov. 16, 2021, provisional application No. 63/241,137, filed on Sep. 7, 2021.

(51) Int. Cl.
*G06K 9/00*       (2022.01)
*G01S 17/89*      (2020.01)
(Continued)

(52) U.S. Cl.
CPC ............ *G06V 10/811* (2022.01); *G01S 17/89* (2013.01); *G06V 10/776* (2022.01)

(58) Field of Classification Search
CPC ...... G06V 10/811; G06V 10/776; G01S 17/89
See application file for complete search history.

(56) References Cited

U.S. PATENT DOCUMENTS 11,120,276 B1 * 9/2021 Zhang ................. G06V 10/454
11,703,566 B2 * 7/2023 Cohen ...................... G06T 7/11
                                                          382/159
(Continued)

FOREIGN PATENT DOCUMENTS

| CN | 117572457 A | * | 2/2024 | |
| EP | 3686776 A1 | * | 7/2020 | ......... G06F 18/2413 |
| WO | WO-2021007100 A1 | * | 1/2021 | ............. G01S 17/89 |

OTHER PUBLICATIONS

Sparse-to-dense Feature Matching: Intra and Inter domain Cross-modal Learning in Domain Adaptation for 3D Semantic Segmentation, Duo Peng et al., arXiv, Aug. 2021, pp. 1-10 (Year: 2021).*

(Continued)

*Primary Examiner* — Jayesh A Patel
(74) *Attorney, Agent, or Firm* — Joseph Kolodka

(57) ABSTRACT

Systems and methods are provided for multi-modal test-time adaptation. The method includes inputting a digital image into a pre-trained Camera Intra-modal Pseudo-label Generator, and inputting a point cloud set into a pre-trained Lidar Intra-modal Pseudo-label Generator. The method further includes applying a fast 2-dimension (2D) model, and a slow 2D model, to the inputted digital image to apply pseudo-labels, and applying a fast 3-dimension (3D) model, and a slow 3D model, to the inputted point cloud set to apply pseudo-labels. The method further includes fusing pseudo-label predictions from the fast models and the slow models through an Inter-modal Pseudo-label Refinement module to obtain robust pseudo labels, and measuring a prediction consistency for the pseudo-labels. The method further includes selecting confident pseudo-labels from the robust pseudo labels and measured prediction consistencies to form (Continued)

a final cross-modal pseudo-label set as a self-training signal, and updating batch parameters utilizing the self-training signal.

20 Claims, 5 Drawing Sheets

(51) Int. Cl.
    *G06V 10/776*     (2022.01)
    *G06V 10/80*     (2022.01)

(56) References Cited

U.S. PATENT DOCUMENTS

| | | | |
|---|---|---|---|
| 2020/0219264 A1* | 7/2020 | Brunner | G01S 7/4808 |
| 2021/0012166 A1* | 1/2021 | Braley | G06F 18/251 |
| 2023/0213643 A1* | 7/2023 | Hwang | G06T 7/50 |
| | | | 382/106 |

OTHER PUBLICATIONS

Self-Supervised Person Detection in 2D Range Data using a Calibrated Camera, Dan Jia et al., IEEE, 2021, pp. 13301-13307 (Year: 2021).*
Lidar-Camera Semi-Supervised Learning for Semantic Segmentation, Luca Caltagirone et al., MDPI, 2021, pp. 1-13 (Year: 2021).*
Complete & Label: A Domain Adaptation Approach to Semantic Segmentation of LiDAR Point Clouds, Li Yi et al., CVF,2021, pp. 15363-15373 (Year: 2021).*
Tent: Fully Test-Time Adaptation by Entropy Minimization, Dequan Wang et al., arXiv, Mar. 2021, pp. 1-15 (Year: 2021).*
Test-Time Training with Self-Supervision for Generalization under Distribution Shifts, Yu Sun et al., PMLR, 2020, pp. 1-20 (Year: 2020).*
Two-phase Pseudo Label Densification for Self-training based Domain Adaptation, Inkya Shin et al., arXiv, 2020, pp. 1-17 (Year: 2020).*
Pseudo-labeling for Scalable 3D Object Detection, Benjamin Caine et al., arXiv, Mar. 2021, pp. 1-16 (Year: 2021).*
RGB and LiDAR fusion based 3D Semantic Segmentation for Autonomous Driving, Khaled El Mandawi et al., arXiv, Jul. 2019, pp. 1-7 (Year: 2019).*
XMUDA: Cross-Modal Unsupervised Domain Adaptation for 3D Semantic Segmentation, Maximilian Jaritz et al., arXiv, Mar. 2020, pp. 1-12 (Year: 2020).*
Jaritz, M., Vu, T. H., Charette, R. D., Wirbel, E., & Pérez, P. (Jun. 13, 2020). xmuda: Cross-modal unsupervised domain adaptation for 3d semantic segmentation. In Proceedings of the IEEE/CVF conference on computer vision and pattern recognition (pp. 12605-12614).
Bayoudh, K., Knani, R., Hamdaoui, F., & Mtibaa, A. (Jun. 10, 2021). A survey on deep multimodal learning for computer vision: advances, trends, applications, and datasets. The Visual Computer, 38(8), 2939-2970.
Behley, J., Garbade, M., Milioto, A., Quenzel, J., Behnke, S., Stachniss, C., & Gall, J. (Jun. 15, 2019). Semantickitti: A dataset for semantic scene understanding of lidar sequences. In Proceedings of the IEEE/CVF International Conference on Computer Vision (pp. 9297-9307).
Caesar, H., Bankiti, V., Lang, A. H., Vora, S., Liong, V. E., Xu, Q., . . . & Beijbom, O. (Jun. 13, 2020). nuscenes: A multimodal dataset for autonomous driving. In Proceedings of the IEEE/CVF conference on computer vision and pattern recognition (pp. 11621-11631).
Chi, Z., Wang, Y., Yu, Y., & Tang, J. (Jun. 20, 2021). Test-time fast adaptation for dynamic scene deblurring via meta- auxiliary learning. In Proceedings of the IEEE/CVF Conference on Computer Vision and Pattern Recognition (pp. 9137-9146).
Choy, C., Gwak, J., & Savarese, S. (Jun. 15, 2019). 4d spatio-temporal convnets: Minkowski convolutional neural networks. In Proceedings of the IEEE/CVF Conference on Computer Vision and Pattern Recognition (pp. 3075-3084).
Duerr, F., Weigel, H., Machlisch, M., & Beyerer, J. (Nov. 9, 2020). Iterative deep fusion for 3D semantic segmentation. In 2020 Fourth IEEE International Conference on Robotic Computing (IRC) (pp. 391-397). IEEE.
Geyer, J., Kassahun, Y., Mahmudi, M., Ricou, X., Durgesh, R., Chung, A. S., . . . & Schuberth, P. (Apr. 14, 2020), A2d2: Audi autonomous driving dataset. arXiv preprint arXiv:2004.06320.
Graham, B., Engeicke, M., & Van Der Maaten, L. (Jun. 18, 2018). 3d semantic segmentation with submanifold sparse convolutional networks. In Proceedings of the IEEE conference on computer vision and pattern recognition (pp. 9224-9232).
Graham, B., & van der Maaten, L. (Jun. 5, 2017). Submanifold sparse convolutional networks. arXiv preprint arXiv:1706.01307.
He, K., Zhang, X., Ren, S., & Sun, J. (Jun. 26, 2016). Deep residual learning for image recognition. CVPR. 2016. arXM preprint arXiv:1512. 03385.
Iandola, F. N., Han, S., Moskewicz, M. W., Ashraf, K., Dally, W. J., & Keutzer, K. (Feb. 24, 2016). SqueezeNet: AlexNet-level accuracy with 50x fewer parameters and< 0.5 MB model size. arXiv preprint arXiv:1602.07360.
Ioffe, S., & Szegedy, C. (2015, June 1). Batch normalization: Accelerating deep network training by reducing internal covariate shift. In International conference on machine learning (pp. 448-456). PMLR.
Kim, D., Tsai, Y. H., Zhuang, B., Yu, X., Sclaroff, S., Saenko, K., & Chandraker, M. (Jun. 20, 2021). Learning cross-modal contrastive features for video domain adaptation. In Proceedings of the IEEE/CVF International Conference on Computer Vision (pp. 13618-13627).
Li, Y., Hao, M., Di, Z., Gundavarapu, N. B., & Wang, X. (Dec. 6, 2021). Test-time personalization with a transformer for human pose estimation. Advances in Neural Information Processing Systems, 34, 2583-2597.
El Madawi, K., Rashed, H., El Sallab, A., Nasr, O., Kamel, H., & Yogamani, S. (Oct. 27, 2019). Rgb and lidar fusion based 3d semantic segmentation for autonomous driving. In 2019 IEEE Intelligent Transportation Systems Conference (ITSC) (pp. 7-12). IEEE.
Meyer, G. P., Charland, J., Hegde, D., Laddha, A., & Vallespi-Gonzalez, C. (Jun. 15, 2019). Sensor fusion for joint 3d object detection and semantic segmentation. In Proceedings of the IEEE/CVF Conference on Computer Vision and Pattern Recognition Workshops.
Peng, D., Lei, Y., Li, W., Zhang, P., & Guo, Y. (Jun. 20, 2021). Sparse-to-dense feature matching: Intra and inter domain cross-modal learning in domain adaptation for 3d semantic segmentation. In Proceedings of the IEEE/CVF International Conference on Computer Vision (pp. 7108-7117).
Prabhu, V., Khare, S., Kartik, D., & Hoffman, J. (Jul. 21, 2021). S4t: Source-free domain adaptation for semantic segmentation via self-supervised selective self-training. arXiv preprint arXiv:2107.10140.
Rist, C. B., Enzweiler, M., & Gavrila, D. M. (Jun. 9, 2019). Cross-sensor deep domain adaptation for LiDAR detection and segmentation. In 2019 IEEE Intelligent Vehicles Symposium (IV) (pp. 1535-1542). IEEE.
Ronneberger, O., Fischer, P., & Brox, T. (Oct. 5, 2015). U-net: Convolutional networks for biomedical image segmentation. In International Conference on Medical image computing and computer-assisted intervention (pp. 234-241). Springer, Cham.
Ros, G., Sellart, L., Materzynska, J., Vazquez, D., & Lopez, A. M. (Jun. 26, 2016). The synthia dataset: A large collection of synthetic images for semantic segmentation of urban scenes. In Proceedings of the IEEE conference on computer vision and pattern recognition (pp. 3234-3243).
Saleh, K., Abobakr, A., Attia, M., Iskander, J., Nahavandi, D., Hossny, M., & Nahvandi, S. (Jun. 15, 2019). Domain adaptation for vehicle detection from bird's eye view LIDAR point cloud data. In Proceedings of the IEEE/CVF International Conference on Computer Vision Workshops.

(56) References Cited

OTHER PUBLICATIONS

Shin, I., Woo, S., Pan, F., & Kweon, I. S. (Aug. 23, 2020). Two-phase pseudo label densification for self-training based domain adaptation. In European conference on computer vision (pp. 532-548). Springer, Cham.

Sun, Y., Wang, X., Liu, Z., Miller, J., Efros, A., & Hardt, M. (Nov. 21, 2020). Test-time training with self-supervision for generalization under distribution shifts. In International conference on machine learning (pp. 9229-9248). PMLR.

Tang, H., Liu, Z., Zhao, S., Lin, Y., Lin, J., Wang, H., & Han, S. (Aug. 23, 2020). Searching efficient 3d architectures with sparse point-voxel convolution. In European conference on computer vision (pp. 685-702). Springer, Cham.

Thomas, H., Qi, C. R., Deschaud, J. E., Marcotegui, B., Goulette, F., & Guibas, L. J. (Jun. 15, 2019). Kpconv: Flexible and deformable convolution for point clouds. In Proceedings of the IEEE/CVF international conference on computer vision (pp. 6411-6420).

Tsai, Y. H., Hung, W. C., Schulter, S., Sohn, K., Yang, M. H., & Chandraker, M. (Jun. 18, 2018). Learning to adapt structured output space for semantic segmentation. In Proceedings of the IEEE conference on computer vision and pattern recognition (pp. 7472-7481).

Van der Maaten, L., & Hinton, G. (Nov. 1, 2008). Visualizing data using t-SNE. Journal of machine learning research, 9(11).

Vu, T. H., Jain, H., Bucher, M., Cord, M., & Pérez, P. (Jun. 15, 2019). Advent: Adversarial entropy minimization for domain adaptation in semantic segmentation. In Proceedings of the IEEE/CVF Conference on Computer Vision and Pattern Recognition (pp. 2517-2526).

Wang, D., Shelhamer, E., Liu, S., Olshausen, B., & Darrell, T. (Jun. 18, 2020). Tent: Fully test-time adaptation by entropy minimization. arXiv preprint arXiv:2006.10726.

Wang, Y., Shi, T., Yun, P., Tai, L., & Liu, M. (Jul. 17, 2018). Pointseg: Real-time semantic segmentation based on 3d lidar point cloud. arXiv preprint arXiv:1807.06288.

Wu, B., Wan, A., Yue, X., & Keutzer, K. (May 21, 2018). Squeezeseg: Convolutional neural nets with recurrent crf for real-time road-object segmentation from 3d lidar point cloud. In 2018 IEEE International Conference on Robotics and Automation (ICRA) (pp. 1887-1893). IEEE.

Wu, B., Zhou, X., Zhao, S., Yue, X., & Keutzer, K. (May 20, 2019). Squeezesegv2: Improved model structure and unsupervised domain adaptation for road-object segmentation from a lidar point cloud. In 2019 International Conference on Robotics and Automation (ICRA) (pp. 4376-4382). IEEE.

Xu, J., Zhang, R., Dou, J., Zhu, Y., Sun, J., & Pu, S. (Jun. 20, 2021). Rpvnet: A deep and efficient range-point-voxel fusion network for lidar point cloud segmentation. In Proceedings of the IEEE/CVF International Conference on Computer Vision (pp. 16024-16033).

Yi, L., Gong, B., & Funkhouser, T. (Jun. 20, 2021). Complete & label: A domain adaptation approach to semantic segmentation of lidar point clouds. In Proceedings of the IEEE/CVF conference on computer vision and pattern recognition (pp. 15363-15373).

Zou, Y., Yu, Z., Kumar, B. V. K., & Wang, J. (Sep. 8, 2018). Unsupervised domain adaptation for semantic segmentation via class-balanced self-training. In Proceedings of the European conference on computer vision (ECCV) (pp. 289-305).

Zou, Y., Yu, Z., Liu, X., Kumar, B. V. K., & Wang, J. (Jun. 15, 2019). Confidence regularized self-training. In Proceedings of the IEEE/CVF International Conference on Computer Vision (pp. 5982-5991).

\* cited by examiner

MULTI-MODAL TEST-TIME ADAPTATION

RELATED APPLICATION INFORMATION

This application claims priority to U.S. Provisional Application No. 63/241,137, filed on Sep. 7, 2021, and U.S. Provisional Application No. 63/279,715 filed on Nov. 16, 2021, both incorporated herein by reference in its entirety.

BACKGROUND

Technical Field

The present invention relates to multi-modal test-time adaptation, and more particularly multi-modal approaches for 3D semantic segmentation.

Description of the Related Art 3D semantic segmentation can allow understanding the semantics presented in the environment, as well as the geometry structured in the real world. This is an emerging topic with several applicable areas, e.g., autonomous systems, AR, construction/factory security, and warehouse management.

SUMMARY

According to an aspect of the present invention, a method is provided for multi-modal test-time adaptation. The method includes inputting a digital image into a pre-trained Camera Intra-modal Pseudo-label Generator (C-Intra-PG), and inputting a point cloud set into a pre-trained Lidar Intra-modal Pseudo-label Generator (L-Intra-PG). The method further includes applying a fast 2-dimension (2D) model, $F^{2D}$, and a slow 2D model, $S^{2D}$, to the inputted digital image to apply pseudo-labels to the digital image, and applying a fast 3-dimension (3D) model, $F^{3D}$, and a slow 3D model, $S^{3D}$, to the inputted point cloud set to apply pseudo-labels to the Lidar point cloud set. The method further includes fusing pseudo-label predictions from the fast ($F^{2D}$, $F^{3D}$) models and the slow ($S^{2D}$, $S^{3D}$) models through Inter-modal Pseudo-label Refinement (Inter-PR) module to obtain robust pseudo labels, and measuring a prediction consistency for each of the image pseudo-labels and Lidar pseudo-labels separately. The method further includes selecting confident pseudo-labels from the robust pseudo labels and measured prediction consistencies to form a final cross-modal pseudo-label set as a self-training signal, and updating batch parameters of the Camera Intra-modal Pseudo-label Generator and Lidar Intra-modal Pseudo-label Generator utilizing the self-training signal.

According to another aspect of the present invention, a computer system is provided for multi-modal test-time adaptation. The system includes one or more processors, a display screen coupled to the one or more processors through a bus, and memory coupled to the one or more processors through the bus, wherein the memory includes a multi-modal test-time adaptation tool configured to: receive a digital image into a pre-trained Camera Intra-modal Pseudo-label Generator (C-Intra-PG); receive a point cloud set into a pre-trained Lidar Intra-modal Pseudo-label Generator (L-Intra-PG); apply a fast 2-dimension (2D) model, $F^{2D}$, and a slow 2D model, $S^{2D}$, to the inputted digital image to apply pseudo-labels to the digital image; apply a fast 3-dimension (3D) model, $F^{3D}$, and a slow 3D model, $S^{3D}$, to the inputted point cloud set to apply pseudo-labels to the Lidar point cloud set; fuse pseudo-label predictions from the fast ($F^{2D}$, $F^{3D}$) models and the slow ($S^{2D}$, $S^{3D}$) models through Inter-modal Pseudo-label Refinement (Inter-PR) module to obtain robust pseudo labels; measure a prediction consistency for each of the image pseudo-labels and Lidar pseudo-labels separately; select confident pseudo-labels from the robust pseudo labels and measured prediction consistencies to form a final cross-modal pseudo-label set as a self-training signal; and update batch parameters of the Camera Intra-modal Pseudo-label Generator and Lidar Intra-modal Pseudo-label Generator utilizing the self-training signal.

According to another aspect of the present invention, a non-transitory computer readable storage medium comprising a computer readable program for multi-modal test-time adaptation is provided. The computer readable program when executed on a computer causes the computer to perform the steps of: receiving a digital image into a pre-trained Camera Intra-modal Pseudo-label Generator (C-Intra-PG); receiving a point cloud set into a pre-trained Lidar Intra-modal Pseudo-label Generator (L-Intra-PG); applying a fast 2-dimension (2D) model, $F^{2D}$, and a slow 2D model, $S^{2D}$, to the inputted digital image to apply pseudo-labels to the digital image; applying a fast 3-dimension (3D) model, $F^{3D}$, and a slow 3D model, $S^{3D}$, to the inputted point cloud set to apply pseudo-labels to the Lidar point cloud set; fusing pseudo-label predictions from the fast ($F^{2D}$, $F^{3D}$) models and the slow ($S^{2D}$, $S^{3D}$) models through Inter-modal Pseudo-label Refinement (Inter-PR) module to obtain robust pseudo labels; measuring a prediction consistency for each of the image pseudo-labels and Lidar pseudo-labels separately; selecting confident pseudo-labels from the robust pseudo labels and measured prediction consistencies to form a final cross-modal pseudo-label set as a self-training signal; and updating batch parameters of the Camera Intra-modal Pseudo-label Generator and Lidar Intra-modal Pseudo-label Generator utilizing the self-training signal.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
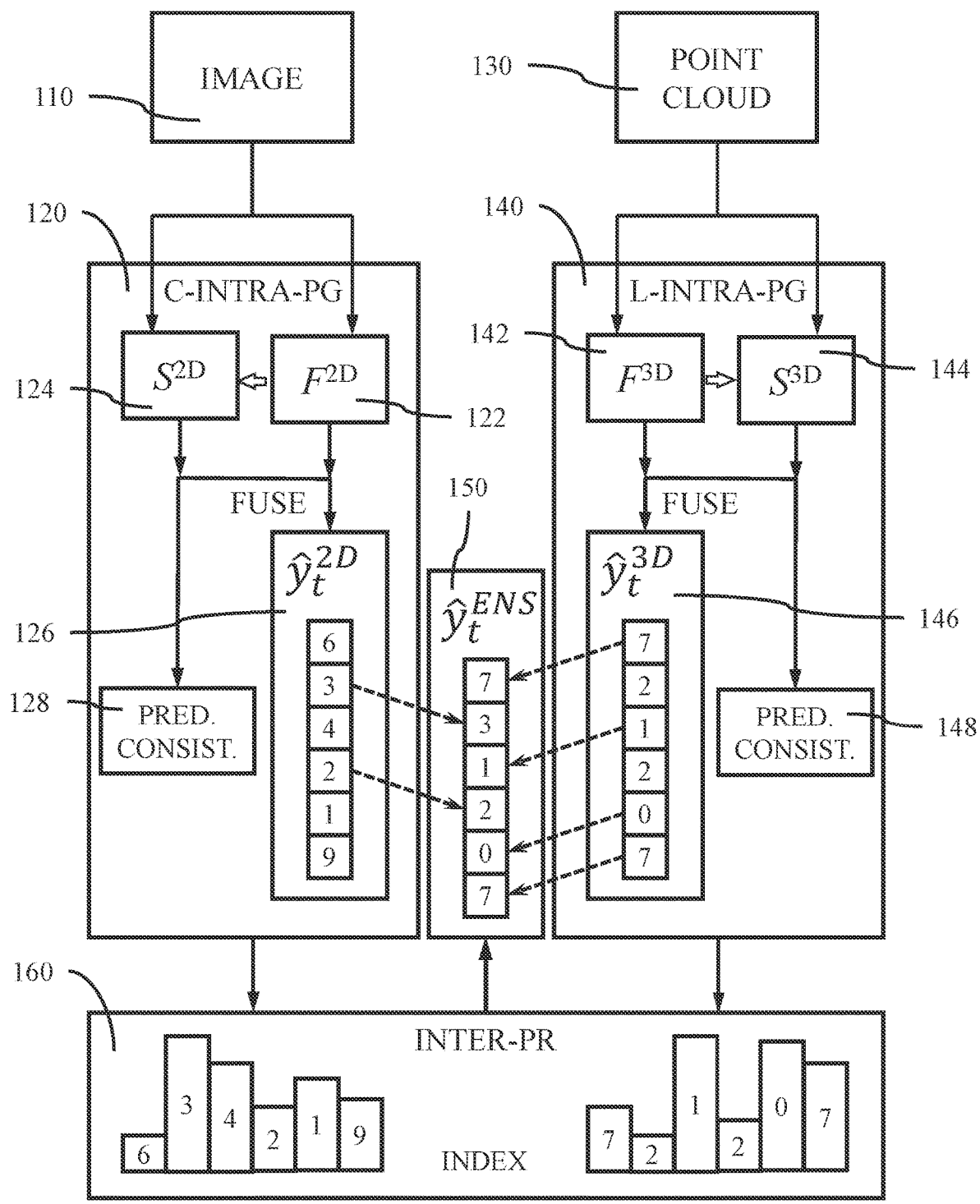
FIG. 1 shows high-level system/method for multi-modal test-time adaptation, in accordance with an embodiment of the present invention.

In accordance with embodiments of the present invention, systems and methods are provided for 3-dimensional (3D)

semantic segmentation. 3D semantic segmentation is a task that involves both geometric and semantic reasoning about the input scene, and can provide rich insights that enable various applications, such as autonomous driving, virtual reality and robotics. Multi-modal sensors may effectively tackle this task. To obtain more accurate 3D point-level semantic understanding, contextual information in 2D Red-Green-Blue (RGB) images can be reinforced by the geometric property of 3D points from LiDAR sensors, and vice versa. Both digital image(s) and LiDAR data can be used as input.

In accordance with embodiments of the present invention, systems and methods are provided for a Multi-Modal Test-Time Adaptation method that enables both 2D and 3D to quickly adapt to new test data without access to source domain data. Multi-modal data is sensitive to distribution shift at test time when a domain gap exists in the training data. In various embodiments, a model may be quickly adapted to the new multi-modal data during testing and obtain better performance, i.e., through test-time adaptation (TTA). Test-time adaptation approaches allows handling domain shift without access to the source domain data. In TTA, there may only be access to model parameters pre-trained on the source data and the new test data for fast adaptation, where only the target data may be available for distribution alignment, and the budget for adaptation can also be limited.

To achieve the satisfactory performance, it is important to make the model generalizable to various environments, e.g., cities, weather and lighting conditions, or scene types (indoor and outdoor). However, models trained in some specific datasets would not generalize well to unseen data distributions, which limits the applicability. For example, the model trained using the data collected from San Francisco may not work well when testing it in Tokyo, as these two cities have very different road scenes. Therefore, we aim to improve the model generalization when training on specific datasets, while testing on unseen datasets that are not involved during the training process.

For training a domain generalizable model, the difficulty lies in the requirement of designing a training scheme that can regularize the model not just overfitting to the training data, as it may have a very different data distribution from the unseen target data. To tackle this issue, one can collect more diverse data, but it will require large-scale data annotations, which is even much more expensive for the 3D semantic segmentation task than other computer vision tasks.

Therefore, an additional resource, simulation data, which does not require human efforts for collecting and annotating the digital image/LiDAR data, can be leveraged. Here, although the simulation data is usually not that realistic, it can still serve a role to prevent the model from overfitting to the real training data. Every pixel of the training data can be annotated. To this end, when training the model using the real data, the simulation data can be added as a regularization, so that the model has a more challenging objective to achieve by considering both the real and simulation data, thus having a better generalization ability to the unseen data. Multi-modal input can be considered jointly to improve performance stability. Each modality can provide regularized self-supervisory signals to the other one.

To fully exploit the advantage of using the simulation data, we also leverage it for our multi-modal learning modules. First, we pre-train the segmentation models using either the image or LiDAR input from the simulation data. With these pre-trained models, we design an adaptive learning manner during training/testing on the real data. Specifically, we calculate the uncertainty (entropy) of predictions as the weight when combining the outputs from image and LiDAR model branches, so that the model is aware of the quality of prediction in each branch. For example, when the output uncertainty from the image branch is higher than the LiDAR one, we should trust more on the LiDAR branch. Similar strategies can be also applied to the testing phase, where the uncertainty can be calculated to determine an adaptive manner for combining output predictions from the image and LiDAR branches.

Another way to improve 3D semantic segmentation is to use multi-modal data, e.g., images and LiDARs, so that the model generalization can be also improved. However, different modalities have very different characteristics. For example, RGB images contain strong appearance cues, while LiDAR sensors are able to capture the 3D structure information of objects. Therefore, how to design an effective algorithm that can fuse these two modalities is important in our domain generalization pipeline for 3D semantic segmentation (see FIG. 1). To handle multi-modal domain generalization, a framework that leverages the simulation data as an annotation-free anchor domain is proposed, which also provides the guidance for fusing the information from two modalities. Both image and LiDAR data can be used as input.

In one or more embodiment, a framework that can take advantage of multimodality, where each modality can provide regularized self-supervisory signals to the other one is provided, where two complementary modules can be integrated within and across modalities.

Since our domain generalizable 3D semantic segmentation model can be trained using multiple datasets containing diverse data distributions, it could be easily deployed in various environments/scenarios and produce robust performance, e.g., for indoor and outdoor scene understanding applications. Moreover, adding new datasets for training becomes easier, which could further improve the performance in the unseen target domain where we would like to deploy the system.

We leverage the annotation-free simulation data as a regularization for domain generalizable 3D semantic segmentation. In addition, we consider multi-modal data and introduce an uncertainty measurement for effectively fusing the information from different modalities, in both training and testing stages.

It is to be understood that aspects of the present invention will be described in terms of a given illustrative architecture; however, other architectures, structures, and process features and steps can be varied within the scope of aspects of the present invention.

Referring now in detail to the figures in which like numerals represent the same or similar elements and initially to FIG. 1, a high-level system/method for multi-modal test-time adaptation is illustratively depicted in accordance with one embodiment of the present invention.

In one or more embodiments, the model includes 2D and 3D branches, $S^{2D}$ and $S^{3D}$, each of which includes a feature extractor, $F^{2D}/F^{3D}$, and a classifier. Here, we denote the multi-modal test-time target data, images, $x_t^{2D} \in \mathbb{R}^{H \times W \times 3}$, and point clouds, $x_t^{3D} \in \mathbb{R}^{N \times 3}$, (3D points in the camera field of view).

In one or more embodiments, images 110, $x_t^{2D} \in \mathbb{R}^{H \times W \times 3}$, can be fed into a Camera Intra-modal Pseudo-label Generation/Generator (C-Intra-PG) 120, which can include a fast 2-dimension (2D) model 122, $F^{2D}$, and a slow 2D model

124, $S^{2D}$. Intra-modal Pseudo-label Generation/Generator (Intra-PG) can obtain more reliable pseudo labels within each modality (sensor/data type) via information aggregation of two models that are updated by the target data in different spaces. The models can make a prediction of the pseudo-labels.

Note that the feature extracted from the 2D branch, $F^{2D}(x_t^{2D}) \in \mathbb{R}^{H \times W \times 3}$ can be sampled at the N projected 3D points resulting in a feature shape of N×f. Individual network predictions from 2D/3D are denoted as:

$$p(x_t^M) = S^M(x_t^M) \in \mathbb{R}^{N \times K};$$

where K is the number of categories, and $M \in \{2D, 3D\}$, and target mini-batch input $x_t^M$ with $M \in \{2D, 3D\}$.

The categories of scene understanding tasks can include, for example: classification (what? [class]), detection (what and where? [class+localization]), segmentation (what and where [pixel level class and localization]). This can be used to understand the outdoor and indoor environments. 3D semantic segmentation helps to understand real-world more.

Batch Normalization can be used in DNNs for both 2D and 3D models. It can include normalization statistics and transformation parameters in the j-th BN layer given the target mini-batch input $x_t^M$ with $M \in \{2D, 3D\}$:

$$\hat{x}_{t_j}^M = \frac{x_{t_j}^M - \mu_{t_j}^M}{\sigma_{t_j}^M}, y_{t_j}^M = \gamma^M \hat{x}_{t_j}^M + \beta^M,$$

$$\text{where } \mu_{t_j}^M = \mathbb{E}\left[x_{t_j}^M\right] \text{ and } \left(\sigma_{t_j}^M\right) = \mathbb{E}\left[\left(\mu_{t_j}^M - x_{t_j}^M\right)^2\right]$$

are normalization statistics, and $y_{t_j}^M$ and $\beta_{t_j}^M$ are the learnable transformation parameters. For simplicity we integrate the notation into $\Omega_t^{2D} = (\mu, \sigma, \gamma, \beta)_t^{2D}$ for 2D, and $\Omega_t^{3D} = (\mu, \sigma, \gamma, \beta)_t^{3D}$ for 3D.

In one or more embodiments, point cloud 130, $x_t^{3D} \in \mathbb{R}^{N \times 3}$, can be fed into a Lidar Intra-modal Pseudo-label Generation/Generator (L-Intra-PG) 140, which can include a fast 3-dimension (3D) model 142, $F^{3D}$, and a slow 3D model 124, $S^{3D}$.

Each model can first make a prediction to generated pseudo labels 126, 146. And each model has a momentum model with the parameters being exponential moving average.

Point clouds 130 from LiDAR are considered to be a modality for scene understanding tasks aimed at semantically segmenting each LiDAR point. LiDAR point clouds, however, lack 2D contextual information that is used to understand the complex semantics of a scene. Therefore, both visual images (e.g., 2D RGB) and LiDAR (multi-modal) can be used and input to Intra-PG module(s) 120, 140 for 3D segmentation. Considering both contextual and geometric information from each modality can improve the performance in 3D semantic segmentation. However, since each modality has different dataset biases (e.g., style distribution in 2D and point distribution in 3D), multi-modality based models are harder to adapt to new data.

The test-time adaptation setting considers the test data statistics during testing, to improve the results compared to multi-modal baselines without adaptation.

Unsupervised Domain Adaptation (UDA) aims at bridging the gap between labeled source data and unlabeled target data.

Entropy minimization can tend to generate sharp output distributions, and using it separately for 2D and 3D branches may increase the cross-modal discrepancy.

In various embodiments, there can be an extension to entropy minimization as a self-training loss to update batch norm parameters, that updates parameters in individual branches for each modality (2D image and 3D LiDAR). In various embodiments, a way to alleviate cross-modal discrepancy is to utilize a consistency loss between predictions of 2D and 3D branches, via KL divergence. Since the test data during adaptation is unlabeled, enforcing the consistency across modalities may even worsen predictions if the output of one branch is inaccurate. In various embodiments, a cross-modal regularized self-training framework that aims to generate robust and adaptive pseudo labels can be utilized.

Reliable pseudo labels 126, 146 in each modality can be produced, that alleviate the instability issue in test-time adaptation, that is, only updating batch norm parameters by seeing the test data once. To maintain the model stability, the global batch norm statistics can be initialized from the pre-trained source model with gradual momentum update from the local model, while the local batch norm parameters are directly updated by the test data, which is more aggressive but also provides up-to-date statistics.

In various embodiments, the Intra-PG module(s) 120, 140 can measure the prediction consistencies 128, 148 of each modality separately, and then provide a fused prediction from each from Intra-PG module for global-local (Fast/Slow) models to the Inter-modal Pseudo-label Refinement (Inter-PR) module 160. The two modules may seamlessly work with each other, where the Intra-PG module 120, 140 produces reliable pseudo labels for each modality and the Inter-PR module 160 adaptively selects confident pseudo labels across modalities. The Inter-PR module 160 can be configured to select the pseudo-labels provided by most consistent modality (e.g., Image or Lidar) for model updating.

Based on the consistency, the Inter-PR module 160 mixes the relevant or more confident pseudo labels from each of the individual sensors, which is a form of late fusion. Late fusion can be combined with mid-level fusion.

In various embodiments, the Inter-modal Pseudo-label Refinement (Inter-PR) 160 adaptively selects more reliable pseudo labels 126, 146 from the different modalities based on a proposed consistency scheme measurement 128, 148 and comparison. Based on these consistencies, the model can adaptively select confident pseudo labels to form a final cross-modal pseudo label(s) 150 (i.e., ensemble), as the self-training signal to update the 2D/3D batch norm parameters.

For the inter-modal module 160, confident pseudo labels can be adaptively selected from the individual 2D and 3D branches, because each modality brings its own advantage for 3D semantic segmentation. The proposed two modules can collaborate with each other for multi-modal test-time adaptation.

In various embodiments, predictions from the fast ($F^{2D}$, $F^{3D}$) models and the slow ($S^{2D}$, $S^{3D}$) models can be fused (combined) for obtaining robust pseudo labels.

For the real data, the input can be images captured by the camera (e.g., RGB camera) and/or point clouds captured by the LiDAR sensor. RGB cameras and LIDAR have different reasons for dataset bias which causes performance drop. RGB cameras can suffer from Dataset bias from appearance gap.

Similarly, for the simulation data, the input can be images and/or point clouds. Then, the image inputs are fed into the image convolutional neural network (CNN) branch, while the point cloud data is fed into the point cloud branch. Their corresponding segmentation outputs are image branch, real data, image branch, simulation, point cloud branch, real data, and point cloud branch, simulation.

For the outputs of the simulation data, they can be used to supervise the image and point cloud branches by the task loss, with respect to the 3D semantic segmentation ground truth (GT_S), which is annotation-free. This task loss can also be considered as a regularization on top of the loss for real data.

Given the simulation-guided models, we can calculate the uncertainty of the outputs. Then, we use this uncertainty to fuse the outputs from two modalities. That is, this fusion process is adaptive in a way that it will be based on the real input data to determine the fusion weights for two modalities.

fusion process is adaptive in a way that it will be based on the real input data to determine the fusion weights for two modalities. A task loss for 3D semantic segmentation can be applied with respect to the ground truth GT_R. Note that, during testing on unseen domains, the data flow is also the same as the one input images and point clouds, which also considers adaptive fusion via simulation-guided models.

We use the simulation data as the anchor domain to achieve domain generalization. To this end, we pre-train the models using the image and point cloud, and then use this pre-trained model as the guidance for fusing the outputs of real image and point cloud outputs. A model is able to fuse predictions from the global and local statistics to enjoy their complementary benefits.

In various embodiments, regularized pseudo labels can produce stable self-learning signals in numerous multi-modal test-time adaptation scenarios for 3D semantic segmentation.

Test-Time Adaptation (TTA) can enable the model to quickly adapt to new target test data without having the source domain data. An entropy minimization method can be utilized to optimize for test-time batch norm parameters without involving a proxy task during training. However, entropy minimization tends to encourage the model to increase confidence despite false predictions.

Test time sees each sample once, so the model cannot be checked. Instead, the model is trained and updated on unlabeled data.

The entropy minimization for the MM-TTA baseline is expressed as:

$$L_{ent}(x_t) = -\sum_k p(x_t^{2D})^{(k)} \log p(x_t^{2D})^{(k)} - \sum_k p(x_t^{3D})^{(k)} \log p(x_t^{3D})^{(k)},$$

where k denotes the class. Despite its simplicity, this objective may be prone to assigning a sharp output distribution, which may result in a trivial solution for both modalities.

Self-learning with Consistency aims to achieve multi-modal test-time adaptation via a consistency loss between predictions of 2D and 3D modalities:

$$L_{cons}(x_t) = D_{KL}(p(x_t^{2D}) \| p(x_t^{3D})) + D_{KL}(p(x_t^{3D}) \| p(x_t^{2D})),$$

where $D_{KL}$ is the KL divergence. The MM-TTA is not regularized by the source task loss and thereby this objective may fail to capture the correct consistency when one of the branches provides a wrong prediction.

In one or more embodiments, Intra-PG 120, 140 can be used to generate robust online pseudo labels within each modality by introducing two models, $S^M$ and $G^M$, with different updating spaces. A local model, $S^M$, replaces and updates batch norm statistics directly from the test data, which is also used as the final model for test-time adaptation. A global model, $G^M$, is initially source pre-trained and has a momentum update scheme from the local model, $S^M$. That is, the statistics in the local model is updated more aggressively by the test data, while the global model's statistics gradually move towards the target statistics, and thus it provides a stable and complementary supervisory signal.

Here, we present the batch norm statistics for the global model, $G^M$, as:

$$\Omega_{t_i}^G = (1-\lambda)\Omega_{t_i}^S + \lambda \Omega_{t_{i-1}}^G,$$

$$\Omega_{t_0}^G = \Omega_S,$$

where $\Omega_t^G = (\mu, \sigma, \gamma, \gamma)_t$ is the moving averaged statistics at iteration i with momentum factor $\lambda$ to aggregate local statistics, $\Omega_{t_i}^S$, and global statistics, $\Omega_{t_{i-1}}^G$.

The initial statistics $\Omega_{t_0}^G$ is from the source pre-trained model denoted as $\Omega_S^G$.

Note that, when we set a large value for $\lambda$, it will move slower towards the target statistics, and otherwise it moves faster. To further leverage both the global and local statistics in each modality, we fuse their predictions as:

$$p(x_t^M) = \frac{(G^M(x_t^M) + S^M(x_t^M))}{2}.$$

Then, we can obtain global-local aggregated pseudo labels for each modality $M \in \{2D, 3D\}$:

$$\hat{y}_t^M = \arg\max_{k \in K} p(x_t^M)^{(k)}.$$

where $p(x_t)^{(k)}$ is the prediction for class k and is larger than the threshold, $\theta^{(k)}$.

After obtaining initial global-local aggregated pseudo labels for each modality, the Inter-PR module can improve pseudo labels via cross-modal fusion. To realize this, we first calculate a consistency measure between global and local models of Intra-PG for each modality M separately:

$$cons_M = Sim(G^M(x_t^M), S^M(x_t^M)),$$

where we define Sim(•) as the inverse of KL divergence to express the similarity between two probabilities:

$$Sim(x, y) = \left(\frac{1}{D_{KL}(x\|y) + \epsilon} + \frac{1}{D_{KL}(y\|x) + \epsilon}\right)/2.$$

This consistency measure helps us to fuse the per-modality predictions and estimate more reliable pseudo labels. We propose two variants: Hard Select and Soft Select. The former takes each pseudo label exclusively from one of the modalities, while the latter conducts a weighted sum of pseudo labels from the two modalities using the consistency measure. We define Hard Select as:

$$\hat{y}_t^H = \begin{cases} \hat{y}_t^{2D}, & \text{if } cons_{2D} \geq cons_{3D}, \\ \hat{y}_t^{3D}, & \text{otherwise.} \end{cases}$$

and Soft Select as $$\hat{y}_t^S = \arg\max_{k \in K} p_t^{W(k)},$$

with $$p_t^{W(k)} = cons_{2D}^* p(x_t^{2D})^{(k)} + cons_{3D}^* p(x_t^{3D})^{(k)},$$

where $cons_{2D}^* = cons_{2D}/(cons_{2D} + cons_{3D})$, and $cons_{3D}^* = 1 - cons_{2D}^*$ are normalized consistency measures.

We ignore pseudo labels whose maximum consistency measure over the two modalities, i.e., max($cons_{2D}$, $cons_{3D}$), is below a threshold $\theta^{(k)}$. Formally, our MM-TTA objective to use the generated pseudo label $\hat{y}_t$ ($\hat{y}_t^H$ or $\hat{y}_t^S$) for updating batch norm statistics is:

$$L_{mm-tta}(x_t) = L_{seg}(p(x_t^{2D}), \hat{y}_t) + L_{seg}(p(x_t^{3D}), \hat{y}_t).$$

Figure 2:
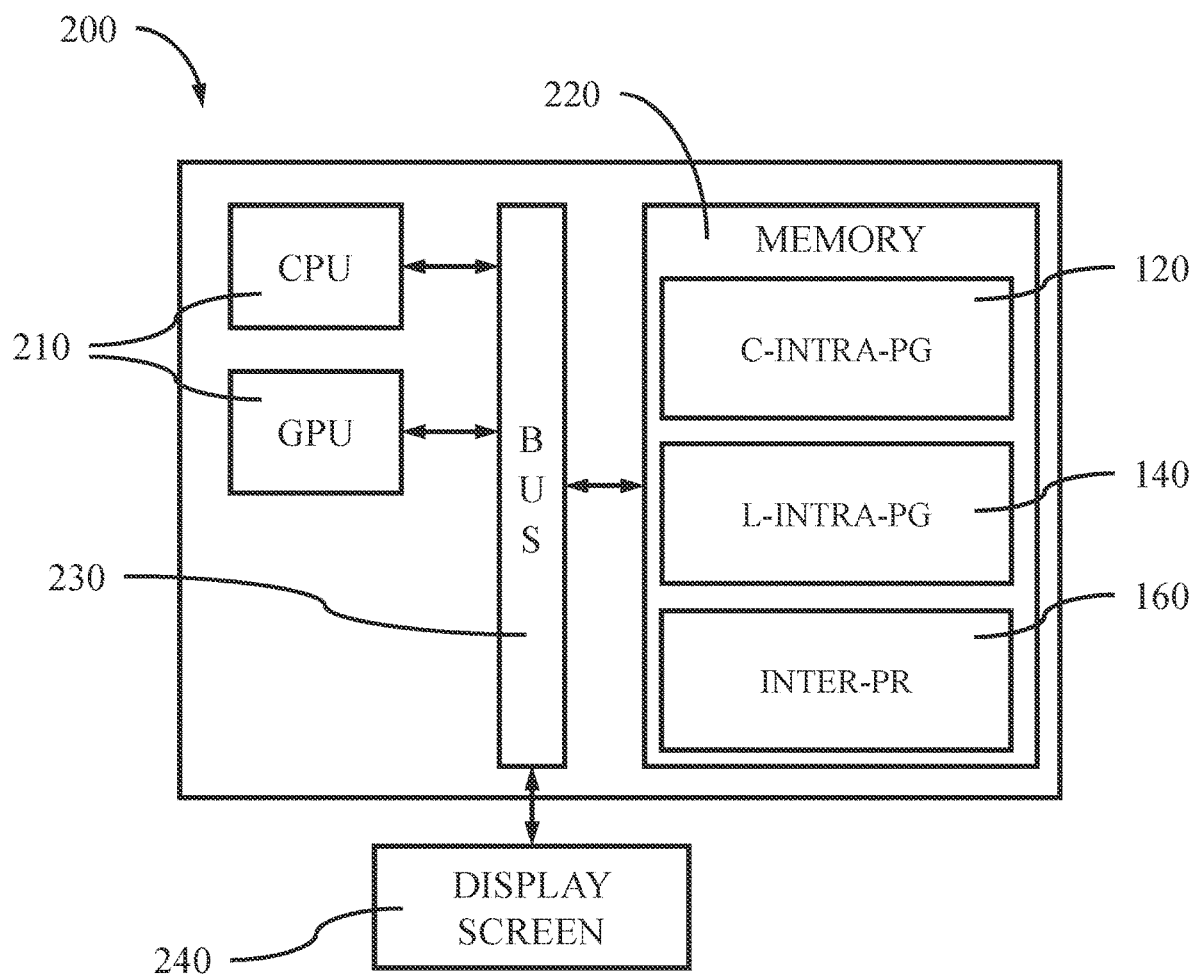
FIG. 2 shows a computer system for multi-modal test-time adaptation, in accordance with an embodiment of the present invention.

Referring now to FIG. 2, FIG. 2 shows a computer system for multi-modal test-time adaptation, in accordance with an embodiment of the present invention.

In one or more embodiments, a computer system 200 for multi-modal test-time adaptation can include one or more processors 210, for example, central processing units (CPUs), graphics processing units (GPUs), and combinations thereof, electrically coupled to a memory 220, for example, hard disk drives (HDDs), solid state drives (SSDs), random access memory (RAM), and combinations thereof, through a bus 230. In various embodiments, the computer system 200 can be configured to perform model training and multi-modal test-time adaptation for 3D semantic segmentation. The output of the system 200 can be presented to a user on a display screen 240 electrically coupled to the system bus 230. Digital images 110 and Lidar point cloud sets 130 can be input to a C-Intra-PG 120 and an L-Intra-PG 140, respectively. The computer system 200 can be configured to be trained and perform the features described in the application and FIGS. 1-5.

In one or more embodiments, the system 200 or multi-modal test-time adaptation can include a Camera Intra-modal Pseudo-label Generation/Generator (C-Intra-PG) 120, a Lidar Intra-modal Pseudo-label Generation/Generator (L-Intra-PG) 140, and an Inter-modal Pseudo-label Refinement (Inter-PR) module 160, stored in the memory 220, to perform multi-modal test-time adaptation (MM-TTA). The Inter-modal Pseudo-label Refinement (Inter-PR) module 160 can be further configured to apply confident pseudo-labels to the digital images and Lidar input data, and a self-training signal to update 2D/3D batch norm parameters. The Inter-modal Pseudo-label Refinement (Inter-PR) module 160 can select confident pseudo-labels from robust pseudo labels and measured prediction consistencies to form a final cross-modal pseudo-label set, that can be presented to a user on the display screen 240.

In one or more embodiments, the computer system 200 can include Camera Intra-modal Pseudo-label Generation/Generator (C-Intra-PG) 120 stored in the memory 220, to apply pseudo-labels to a digital image.

In one or more embodiments, the computer system 200 can include a Lidar Intra-modal Pseudo-label Generation/Generator (L-Intra-PG) 140 stored in the memory 220, to apply pseudo-labels to the Lidar cloud point set.

Figure 3:
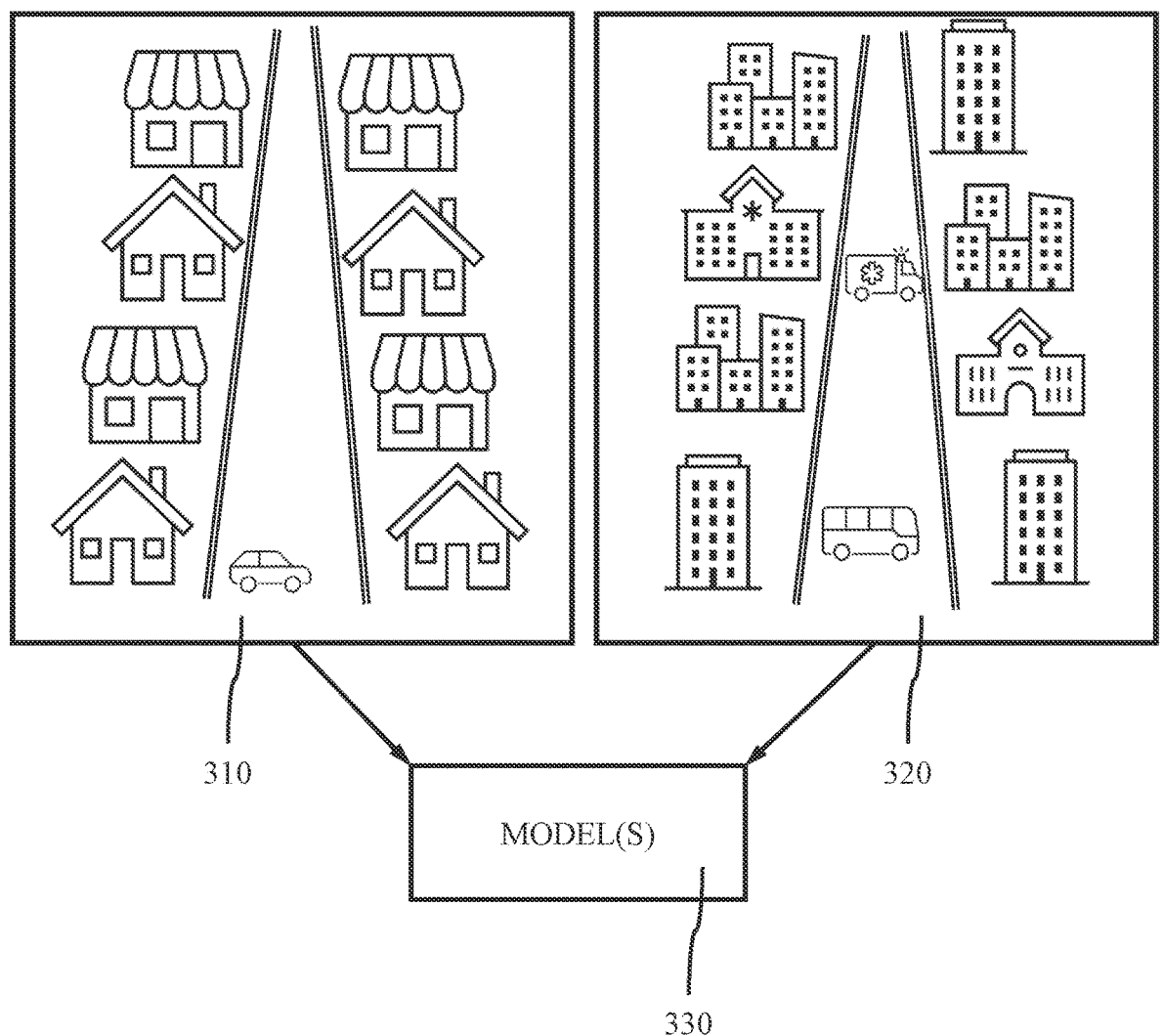
FIG. 3 shows a representation of a training domain and a representation of a test domain, in accordance with an embodiment of the present invention.

Referring now to FIG. 3, FIG. 3 shows a representation of a training domain and a representation of a test domain, in accordance with an embodiment of the present invention.

In one or more embodiments, the multi-modal test-time adaptation tool can be trained on a set of source data (e.g., images, point clouds) for a first domain 310 that represent particular architectural styles, types of buildings, road signs and formats, etc.; whereas, at the time of implementation (e.g., deployment phase), the multi-modal test-time adaptation tool can be present with noticeably different data (e.g., test data) of a second domain 320 that has not been specifically represented in the training data. The multi-modal test-time adaptation tool may perform semantic segmentation on the images obtained from the second domain 320 based on the training from the first domain 310. To improve the performance of the model(s) 330, the multi-modal test-time adaptation tool can adjust the weights of the model(s) 330 during runtime through inference and training by using the real-time input data to adapt to the new domain 320. The multi-modal test-time adaptation tool can adapt the model(s) to the new data.

Figure 4:
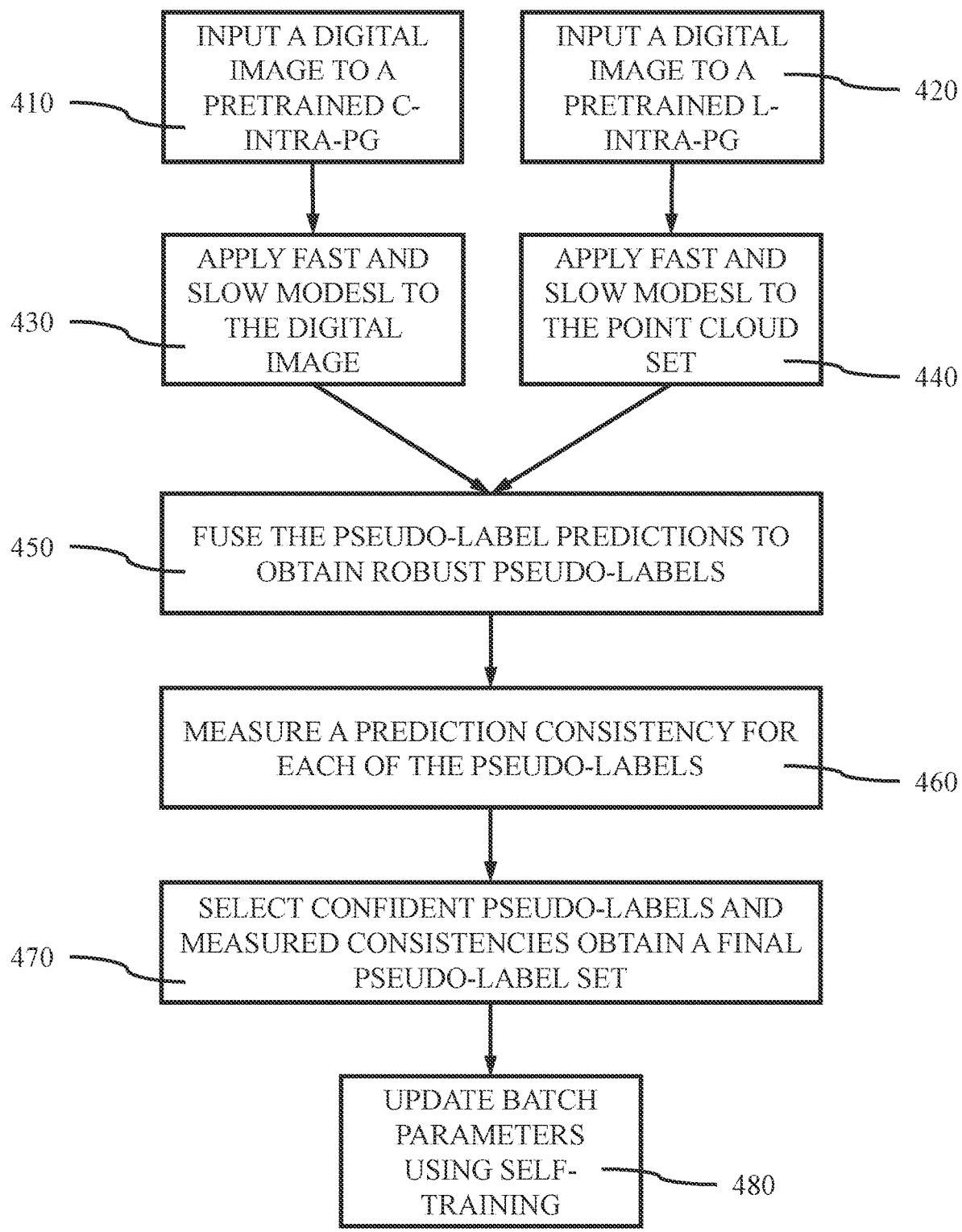
FIG. 4 shows a block/flow diagram for multi-modal test-time adaptation, in accordance with an embodiment of the present invention.

Referring now to FIG. 4, FIG. 4 shows a block/flow diagram for multi-modal test-time adaptation, in accordance with an embodiment of the present invention.

At block 410, a digital image can be inputted into a pre-trained Camera Intra-modal Pseudo-label Generator (C-Intra-PG).

At block 420, a point cloud set can be inputted into a pre-trained Lidar Intra-modal Pseudo-label Generator (L-Intra-PG).

At block 430, a fast 2-dimension (2D) model, $F^{2D}$, and a slow 2D model, $S^{2D}$, can be applied to the inputted digital image to apply pseudo-labels to the digital image.

At block 440, a fast 3-dimension (3D) model, $F^{3D}$, and a slow 3D model, $S^{3D}$, can be applied to the inputted point cloud set to apply pseudo-labels to the Lidar point cloud set.

At block 450, pseudo-label predictions from the fast ($F^{2D}$, $F^{3D}$) models and the slow ($S^{2D}$, $S^{3D}$) models can be fused through Inter-modal Pseudo-label Refinement (Inter-PR) module to obtain robust pseudo labels.

At block 460, a prediction consistency can be measured for each of the image pseudo-labels and Lidar pseudo-labels separately.

At block 470, confident pseudo-labels can be selected from the robust pseudo labels and measured prediction consistencies to form a final cross-modal pseudo-label set as a self-training signal.

At block 480, batch parameters of the Camera Intra-modal Pseudo-label Generator and Lidar Intra-modal Pseudo-label Generator can be updated utilizing the self-training signal.

Figure 5:
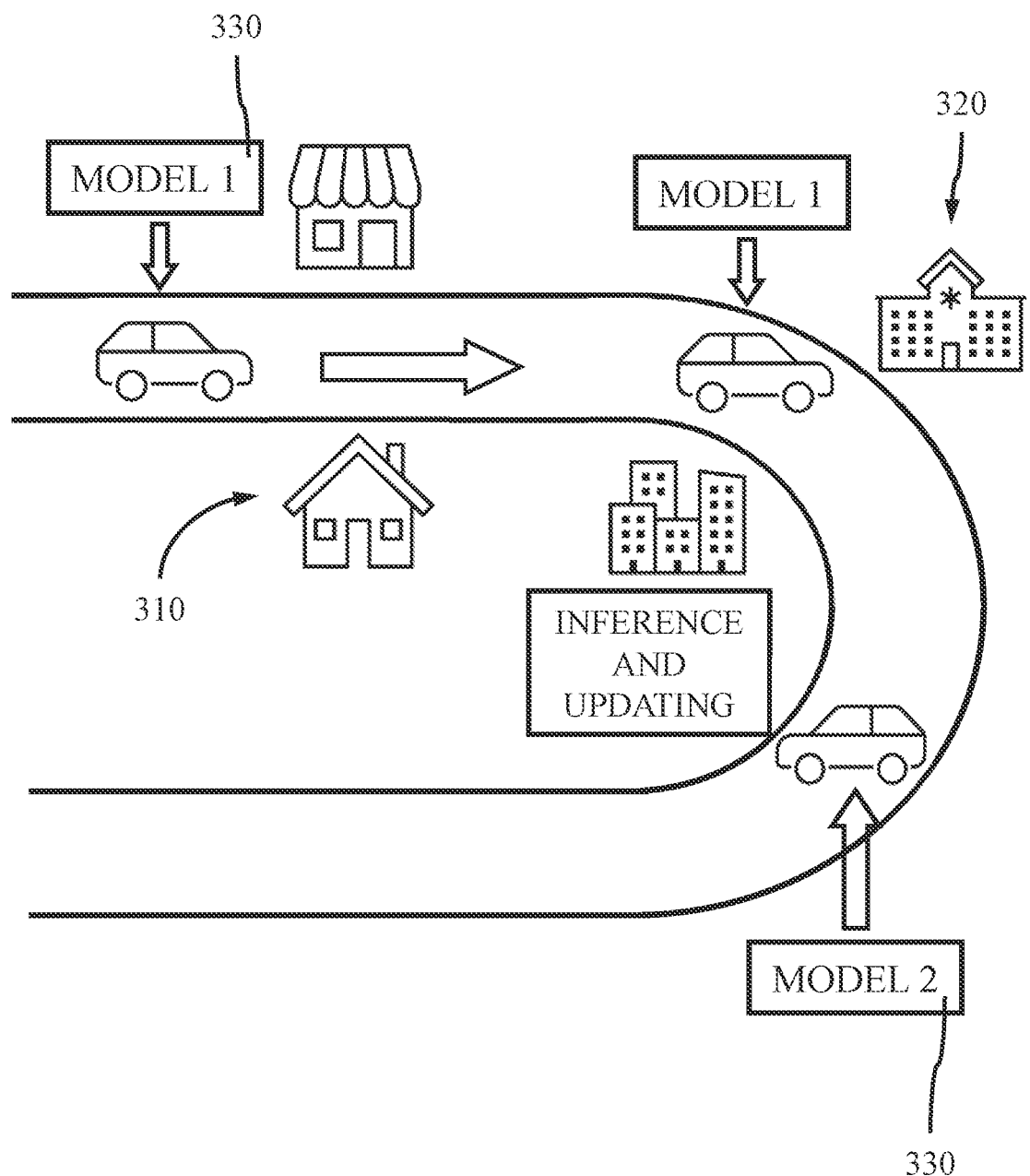
FIG. 5 shows a representation of updating the models from a training domain to an updated models after a one-time exposure to the test domain in the real world, in accordance with an embodiment of the present invention.

Referring now to FIG. 5, FIG. 5 shows a representation of updating the models from a training domain to an updated models after a one-time exposure to the test domain in the real world, in accordance with an embodiment of the present invention.

In one or more embodiments, the implemented models 330 of the semantic segmentation system can originally be based on a first domain 310. The models can experience a second domain 320 and the models updated through self-training using the new one-time data. Selected confident pseudo-labels can be attached to the image and Lidar data and the parameters of the models updated.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for multi-modal test-time adaptation, comprising:
    inputting a digital image into a pre-trained Camera Intra-modal Pseudo-label Generator (C-Intra-PG);
    inputting a Lidar point cloud set into a pre-trained Lidar Intra-modal Pseudo-label Generator (L-Intra-PG);
    applying a fast 2-dimension (2D) model, $F^{2D}$, and a slow 2D model, $S^{2D}$, to the inputted digital image to apply pseudo-labels to the digital image;
    applying a fast 3-dimension (3D) model, $F^{3D}$, and a slow 3D model, $S^{3D}$, to the inputted Lidar point cloud set to apply pseudo-labels to the Lidar point cloud set;

fusing pseudo-label predictions from the fast ($F^{2D}$, $F^{3D}$) models and the slow ($S^{2D}$, $S^{3D}$) models through Inter-modal Pseudo-label Refinement (Inter-PR) module to obtain robust pseudo labels;

measuring a prediction consistency for each of the digital image pseudo-labels and Lidar pseudo-labels separately;

selecting confident pseudo-labels from the robust pseudo labels and measured prediction consistencies to form a final cross-modal pseudo-label set as a self-training signal; and updating batch parameters of the Camera Intra-modal Pseudo-label Generator and Lidar Intra-modal Pseudo-label Generator utilizing the self-training signal.

2. The method as recited in claim 1, further comprising training segmentation models for the C-Intra-PG and the L-Intra-PG including the fast and the slow models with source domain data.

3. The method as recited in claim 2, wherein the digital image and the Lidar point cloud set are multi-modal test-time target data that the C-Intra-PG and the L-Intra-PG see once.

4. The method as recited in claim 3, wherein the digital image is captured at test-time by a camera and the Lidar point cloud set is captured at test-time by a LiDAR sensor.

5. The method as recited in claim 4, wherein consistency is measured as:

$cons_M = Sim(G^M(x_t^M), S^M(x_t^M))$, where $SIM(-)$ is the inverse of KL divergence, and M is the 2D or 3D modality.

6. The method as recited in claim 5, wherein the pseudo-labels are obtained by:

$$\hat{y}_t^M = \arg\max_{k \in K} p(x_t^M)^{(k)}.$$

7. The method as recited in claim 6, wherein the robust pseudo-labels are selected based on a hard select criteria or a soft select criteria.

8. The method as recited in claim 7, wherein pseudo labels with a maximum consistency measure over the two modalities is below a threshold is ignored.

9. A computer system for multi-modal test-time adaptation, comprising:
one or more processors;
a display screen coupled to the one or more processors through a bus; and
memory coupled to the one or more processors through the bus, wherein the memory includes a multi-modal test-time adaptation tool configured to:
receive a digital image into a pre-trained Camera Intra-modal Pseudo-label Generator (C-Intra-PG);
receive a Lidar point cloud set into a pre-trained Lidar Intra-modal Pseudo-label Generator (L-Intra-PG);
apply a fast 2-dimension (2D) model, $F^{2D}$, and a slow 2D model, $S^{2D}$, to the inputted digital image to apply pseudo-labels to the digital image;
apply a fast 3-dimension (3D) model, $F^{3D}$, and a slow 3D model, $S^{3D}$, to the inputted Lidar point cloud set to apply pseudo-labels to the Lidar point cloud set;
fuse pseudo-label predictions from the fast ($F^{2D}$, $F^{3D}$) models and the slow ($S^{2D}$, $S^{3D}$) models through Inter-modal Pseudo-label Refinement (Inter-PR) module to obtain robust pseudo labels;
measure a prediction consistency for each of the digital image pseudo-labels and Lidar pseudo-labels separately;
select confident pseudo-labels from the robust pseudo labels and measured prediction consistencies to form a final cross-modal pseudo-label set as a self-training signal; and
update batch parameters of the Camera Intra-modal Pseudo-label Generator and Lidar Intra-modal Pseudo-label Generator utilizing the self-training signal.

10. The computer system as recited in claim 9, wherein the multi-modal test-time adaptation tool is further configured to train segmentation models for the C-Intra-PG and the L-Intra-PG including the fast and the slow models with source domain data.

11. The computer system as recited in claim 10, wherein the digital image and the Lidar point cloud set are multi-modal test-time target data that the C-Intra-PG and the L-Intra-PG see once.

12. The computer system as recited in claim 11, wherein the digital image is captured at test-time by a camera and the Lidar point cloud set is captured at test-time by a LIDAR sensor.

13. The computer system as recited in claim 12, wherein consistency is measured as:

$cons_M = Sim(G^M(x_t^M), S^M(x_t^M))$, where $SIM(-)$ is the inverse of KL divergence, and M is the 2D or 3D modality.

14. The computer system as recited in claim 13, wherein the pseudo-labels are obtained by:

$$\hat{y}_t^M = \arg\max_{k \in K} p(x_t^M)^{(k)}.$$

15. The computer system as recited in claim 14, wherein the robust pseudo-labels are selected based on a hard select criteria or a soft select criteria.

16. The computer system as recited in claim 15, wherein pseudo labels with a maximum consistency measure over the two modalities below a threshold is ignored.

17. A non-transitory computer readable storage medium comprising a computer readable program for multi-modal test-time adaptation, wherein the computer readable program when executed on a computer causes the computer to perform the steps of:
receiving a digital image into a pre-trained Camera Intra-modal Pseudo-label Generator (C-Intra-PG);
receiving a Lidar point cloud set into a pre-trained Lidar Intra-modal Pseudo-label Generator (L-Intra-PG);
applying a fast 2-dimension (2D) model, $F^{2D}$, and a slow 2D model, $S^{2D}$, to the inputted digital image to apply pseudo-labels to the digital image;
applying a fast 3-dimension (3D) model, $F^{3D}$, and a slow 3D model, $S^{3D}$, to the inputted Lidar point cloud set to apply pseudo-labels to the Lidar point cloud set;
fusing pseudo-label predictions from the fast ($F^{2D}$, $F^{3D}$) models and the slow ($S^{2D}$, $S^{3D}$) models through Inter-modal Pseudo-label Refinement (Inter-PR) module to obtain robust pseudo labels;
measuring a prediction consistency for each of the digital image pseudo-labels and Lidar pseudo-labels separately;
selecting confident pseudo-labels from the robust pseudo labels and measured prediction consistencies to form a final cross-modal pseudo-label set as a self-training signal; and updating batch parameters of the Camera Intra-modal Pseudo-label Generator and Lidar Intra-modal Pseudo-label Generator utilizing the self-training signal.

18. The non-transitory computer readable storage medium as recited in claim 17, wherein the digital image and the Lidar point cloud set are multi-modal test-time target data that the C-Intra-PG and the L-Intra-PG see once.

19. The non-transitory computer readable storage medium as recited in claim 18, wherein consistency is measured as:
$cons_M = Sim(G^M(x_t^M), S^M(x_t^M))$, where SIM(−) is the inverse of KL divergence, and M is the 2D or 3D modality.

20. The non-transitory computer readable storage medium as recited in claim 19, wherein the pseudo-labels are obtained by:

$$\hat{y}_t^M = \arg\max_{k \in K} p(x_t^M)^{(k)},$$

and the robust pseudo-labels are selected based on a hard select criteria or a soft select criteria.

\* \* \* \* \*